(12) United States Patent
Rönnberg et al.

(10) Patent No.: US 8,673,058 B2
(45) Date of Patent: Mar. 18, 2014

(54) METHOD AND ARRANGEMENT FOR REMOVING SOLID PARTICLES AND TAR COMPONENT FROM CARBON MONOXIDE GAS

(75) Inventors: Tom Rönnberg, Espoo (FI); Stefan Hajek, Amberg (DE)

(73) Assignee: Outotec Oyj, Espoo (FI)

( * ) Notice: Subject to any disclaimer, the term of this patent is extended or adjusted under 35 U.S.C. 154(b) by 31 days.

(21) Appl. No.: 13/141,064

(22) PCT Filed: Dec. 21, 2009

(86) PCT No.: PCT/FI2009/051018
§ 371 (c)(1),
(2), (4) Date: Jun. 20, 2011

(87) PCT Pub. No.: WO2010/072894
PCT Pub. Date: Jul. 1, 2010

(65) Prior Publication Data
US 2011/0252967 A1    Oct. 20, 2011

(30) Foreign Application Priority Data

Dec. 22, 2008 (FI) ..................................... 20086231

(51) Int. Cl.
*B01D 53/14* (2006.01)
*B01D 53/02* (2006.01)

(52) U.S. Cl.
USPC ........ 95/92; 95/107; 95/140; 95/214; 95/230; 96/134; 96/361

(58) Field of Classification Search
USPC .................. 95/214, 92, 107; 96/150, 361
See application file for complete search history.

(56) References Cited

U.S. PATENT DOCUMENTS

| 4,097,251 A * | 6/1978 | Murayama et al. ............. 95/274 |
| 2008/0210089 A1 * | 9/2008 | Tsangaris et al. .................. 95/90 |

FOREIGN PATENT DOCUMENTS

JP            63194713 A        8/1988
(Continued)

OTHER PUBLICATIONS

Dunbar, David. Introduction to Baseline Source Inspection Techniques. Lesson 5: Operation of Dry Scrubbers. Self-Instruction Manual. Air Pollution Training Institute SI:445. Environmental Protection Agency. Aug. 1992.*
Timo Maunola, Finnish Search Report for FI 20086231, Oct. 28, 2009.

(Continued)

*Primary Examiner* — Duane Smith
*Assistant Examiner* — Joubert X Glover
(74) *Attorney, Agent, or Firm* — Chernoff Vilhauer McClung & Stenzel, LLP.

(57) ABSTRACT

A method and arrangement for removing solid particles and tar component from carbon monoxide gas. In the method, carbon monoxide gas is conducted from a ferroalloy smelting furnace (1) to a gas scrubber (2), the carbon monoxide gas is scrubbed in the gas scrubber (2) by a liquid medium for removing part of the solid particles, the carbon monoxide gas is conducted from the gas scrubber to a blower (3), the flow rate of the carbon monoxide gas is increased by the blower (3), and the carbon monoxide gas is conducted to a particulate filter (5) and the remaining solid particles are essentially filtered in the particulate filter (5) from the carbon monoxide gas. Prior to conducting the carbon monoxide gas to the particulate filter (5), it is conducted to a particle feeder (4), where finely divided adsorbent particles (A) are fed in the carbon monoxide gas for adhering the tar component on the surface of the adsorbent particles, and the carbon monoxide gas flow containing adsorbent particles is conducted to the particulate filter (5), in which case the tar component adhered on the adsorbent particles is discharged in the particulate filter (5).

11 Claims, 1 Drawing Sheet

(56) References Cited

FOREIGN PATENT DOCUMENTS

| | | | | |
|---|---|---|---|---|
| JP | 8299739 A | 11/1996 | | |
| JP | 2003190838 A | 7/2003 | | |
| WO | 2008074912 A1 | 6/2008 | | |
| WO | WO2008/074912 | * | 8/2008 | ............. B01D 46/04 |

OTHER PUBLICATIONS

Kaarina Aarnisalo, International Search Report for PCT/FI2009/051018, Mar. 16, 2010.

Chinese Office Action for Chinese Application No. 200980151750.6, issued Apr. 7, 2013, 17 pages.

* cited by examiner

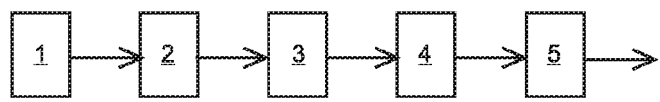
Fig. 1
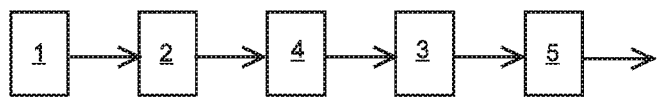
Fig. 2
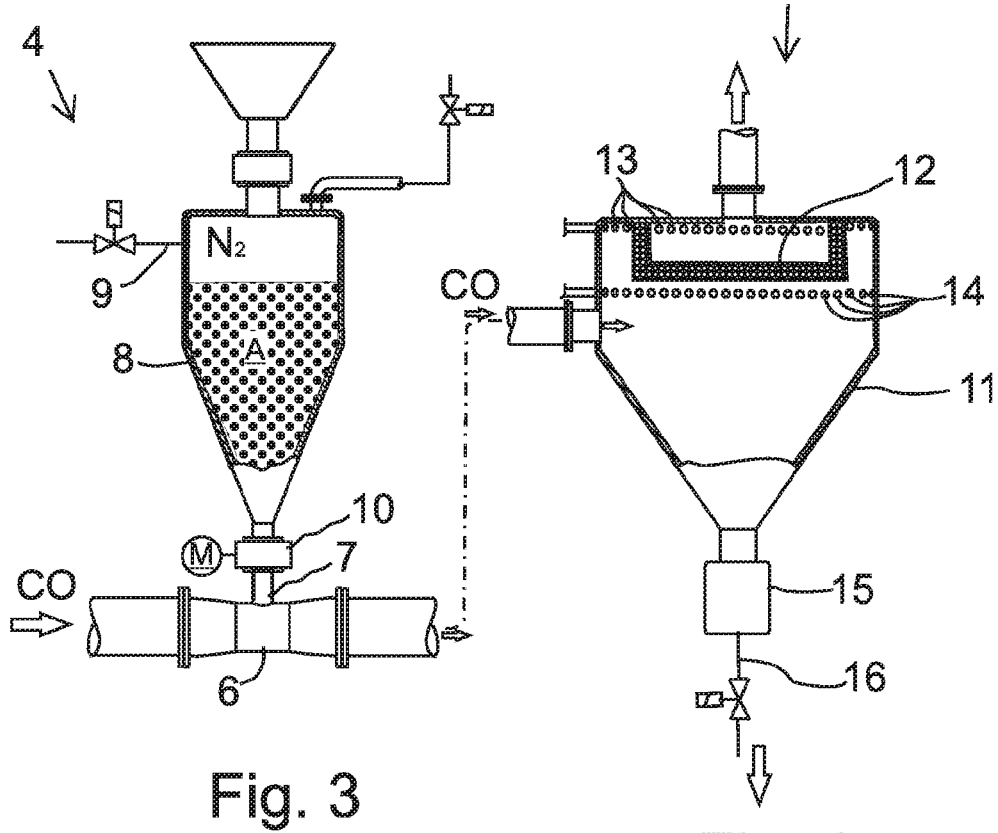
Fig. 3
Fig. 4
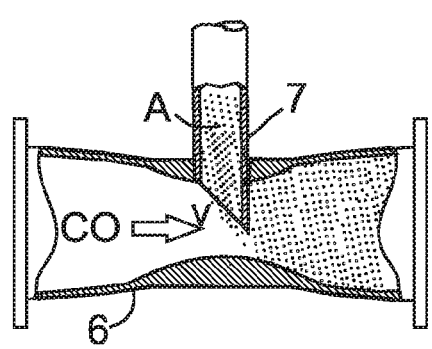
Fig. 5

METHOD AND ARRANGEMENT FOR REMOVING SOLID PARTICLES AND TAR COMPONENT FROM CARBON MONOXIDE GAS

This is a national stage application filed under 35 USC 371 based on International Application No. PCT/FI2009/051018 filed Dec. 21, 2009, and claims priority under 35 USC 119 of Finnish Patent Application No. 20086231 filed Dec. 22, 2008.

FIELD OF INVENTION

The invention relates to a method and arrangement for removing solid particles and tar component from carbon monoxide gas.

BACKGROUND OF INVENTION

The invention relates to metal smelting processes, such as ferrochromium smelting, which is generally carried out in a submerged-arc furnace. The operation of a submerged-arc furnace is based on conducting electric current between electrodes through the material to be smelted. The electric resistance of the material to be smelted generates thermal energy, so that the batch is heated, when a high electric current is conducted through the material to be smelted. The current is transferred to vertically positioned electrodes, which are located symmetrically in a triangle with respect to the furnace center point. When necessary, the positioning depth of the electrodes in the furnace is adjusted, because they are worn at the tips. The electrodes extend to the inside of the furnace via through holes provided in the lid.

Inside an arc furnace having a reducing atmosphere, there prevails a carbon monoxide atmosphere, which is mainly created from coke, semicoke or carbon contained in suitable coal which are fed in the furnace as reductants. Carbon monoxide gas is continuously removed from the furnace. Carbon monoxide gas contains solid particles.

When the burnt coke used as smelting furnace reductant is coked incompletely, and represents for example so-called "instant coked" material that is common in certain areas in the world, for instance in South Africa, the coke also contains tar, the volatile tar components of which are discharged from the furnace along with the carbon monoxide gas. The term 'tar component' here refers to a substance that is released from coke at a high temperature in an oxygen-free atmosphere. It is generally a mixture of short-chain hydrocarbons and long-chain hydrocarbons, aromatic hydrocarbons and sulfur.

In the prior art there is known, from the publication WO 2008/074912 A1, a method and arrangement where carbon monoxide gas containing solid particles is conducted from a smelting furnace first to a gas scrubber, which is generally a venturi scrubber, where a water jet is directed to the downwardly flowing carbon monoxide gas. Owing to the water jet, the solid matter contained in the gas is removed to water, and the cleaned gas is conducted out of the venturi scrubber through an outlet provided in the upper part of the scrubber. Then the flow rate of the carbon monoxide gas is increased by means of a blower. Thereafter the carbon monoxide gas is conducted to a particulate filter, by which the remaining solid particles are essentially removed from the carbon monoxide gas. The particulate filter illustrated in said WO publication includes a filtering chamber, inside which chamber there is arranged a filter element, through which carbon monoxide gas can be conducted, so that the solid particles remain on the surface of the filter element. Inside the chamber, there are provided cleaning nozzles, by which the inert gas blasting, for instance a nitrogen or carbon dioxide pulse, is directed to the filter element in order to remove the solid matter from the filter surface. Inside the chamber, underneath the filter element, there are arranged washing nozzles for feeding washing liquid in the chamber in order to slurry the solid matter removed from the filter to slurry. The slurry is collected in a discharge chamber, from which it is discharged.

The problem is that the tar component contained in gaseous state in the carbon monoxide gas is not removed, neither in the venturi scrubber nor in the particulate filter. Instead, as the temperature of the carbon monoxide gas after the venturi scrubber drops to about 30-50° C., the volatile tar component flowing therealong begins to stick as a viscous mass on the surfaces of the process equipment. It is condensated for instance on the rotor blades of the blower, and in the course of time, the rotor becomes imbalanced, in which case maintenance is needed. Tar is likewise condensated on the surfaces of the filter element in the particulate filter, thus blocking it, and is not removed by inert gas blasting.

The volatile tar component, which after said solid matter cleaning continues its procession along with the carbon monoxide gas, causes many further problems. Generally the carbon monoxide gas is recycled back to the process, where it can be used for example in the strand sintering of pellets for heating the sintering gas, in a preheating silo for preheating pellets etc., in which case the tar blocks burner nozzles, blasting holes and flow channels. The blockages caused by the tar result in a stoppage for performing the maintenance work, which brings forth high expenses.

Further, it is a particular drawback that even if the carbon monoxide gas obtained from smelting furnaces could be an excellent fuel to be used in power plants for the generation of electricity, the tar component contained therein renders it impossible to be used for example in a gas turbine power plant, because the tar would stick to the compressor blades of the gas turbine.

OBJECT OF INVENTION

The object of the invention is to eliminate the above mentioned drawbacks.

A particular object of the invention is to introduce a method and arrangement that enable the removing of the tar component from carbon monoxide gas, at the same time as solid particles are removed therefrom by a particulate filter.

Further, an object of the invention is to introduce a method and arrangement, by means of which the utilization of carbon monoxide gas can be improved. Carbon monoxide gas can be used as recycled in the process and for the generation of electricity, without the tar component being a restraint for said usage.

SUMMARY OF INVENTION

According to the invention, in the method, prior to conducting the carbon monoxide gas to a particulate filter, it is conducted to a particle feeder, where in the carbon monoxide gas, there are fed finely divided adsorbent particles for adsorbing the tar component on the surface of the adsorbent particles, whereafter the carbon monoxide gas flow containing adsorbent particles is conducted to a particulate filter, and the tar component adsorbed on the adsorbent particles is discharged in the particulate filter.

According to the invention, the arrangement includes a particle feeder, which is in the flowing direction arranged prior to the particulate filter, for feeding the finely divided adsorbent particles, adsorbing the tar component, in the carbon monoxide gas.

The adsorbent particles are finely divided coke dust. The using of coke dust as the adsorbent is advantageous, because it is obtained by separating from among the coke used in a smelting furnace. It is necessary to separate it, because coke dust cannot be fed in a smelting furnace because of the danger of a dust explosion. The use of coke dust as an adsorbent is a good way to get rid of this inconvenient side product.

In an embodiment of the method, 80-90% of coke dust has a grain size not larger than 0.075 mm. The smaller the grain size of coke dust is, the larger is the adsorption surface provided for the tar component, and the volatile tar component is all the more efficiently separated from the carbon monoxide gas.

In an embodiment of the method, the flow rate of the carbon monoxide gas is accelerated, and adsorbent particles are mixed in the carbon monoxide gas having an accelerated flow rate.

In an embodiment of the method, in the particle feeder the flow rate of the carbon monoxide gas is accelerated by a venturi pipe, and adsorbent particles are mixed in the carbon monoxide gas in the venturi pipe, by means of a feed pipe that opens into the venturi pipe.

In an embodiment of the method, to achieve a uniform mixing of the adsorbent particles, the flow rate of the carbon monoxide gas is accelerated to the rate of roughly 25-29 m/s.

The method is particularly feasible for cleaning the tar component from the carbon monoxide gas created in the smelting of ferrochromium, which tar component is derived from incompletely coked coke that is used as a reductant in the smelting process.

In an embodiment of the arrangement, the adsorbent particles are finely divided coke dust. Coke dust is advantageous to use, because it is generally always available in the process.

In an embodiment of the arrangement, 80-90% of the coke dust has a grain size not larger than 0.075 mm.

In an embodiment of the arrangement, the particle feeder includes a venturi pipe for accelerating the flow rate of the carbon monoxide gas, and a feed pipe that opens to the venturi pipe for feeding adsorbent particles to the carbon monoxide gas flow that has an accelerated flow rate.

In an embodiment of the arrangement, the flow rate of the carbon monoxide gas in the venturi pipe is roughly 25-29 m/s.

In an embodiment of the arrangement, the particle feeder includes a gas-tight tank for storing adsorbent powder; a gas duct, through which oxygen-free inert gas, such as nitrogen or carbon dioxide, can be fed in the tank for creating an inert gas atmosphere inside the tank; and a shut-off feeder for feeding a continuous adsorbent flow from the tank to the feed pipe.

Carbon monoxide gas is explosive even in small quantities, if it gets in contact with oxygen. Consequently, the access of air in the gas line along with the adsorbent powder must be prevented by arranging inside the tank an inert gas atmosphere by feeding for example nitrogen or carbon dioxide in the tank.

In an embodiment of the arrangement, the particulate filter includes a filtering chamber, inside which there is provided a filter element, through which the carbon monoxide gas can be conducted, so that the solid particles remain on the surface of said filter element; cleaning nozzles inside the chamber for directing the inert gas blasting to the filter element for removing the solid matter from the filter surface; washing nozzles for feeding the washing liquid to the chamber for slurrying the solid matter removed from the filter to slurry; a discharge chamber for collecting the slurry; and a discharge channel for removing the slurry from the discharge chamber. The employed particulate filter can be for example similar to the one described for instance in the publication WO 2008/074912 A1, or any other suitable particulate filter.

LIST OF DRAWINGS

The invention is explained in more detail below, with reference to exemplifying embodiments and to the appended drawing, where FIG. 1 is a schematical illustration of a first embodiment of an arrangement according to the invention, FIG. 2 is a schematical illustration of another embodiment of an arrangement according to the invention, FIG. 3 is a schematical illustration of a particle feeder belonging to the system according to FIG. 1 or 2, FIG. 4 is a schematical illustration of a particle feeder belonging to the system according to FIG. 1 or 2, and FIG. 5 illustrates a cross-section of the venturi pipe belonging to the particle feeder illustrated in FIG. 3 and of the feed pipe connected thereto.

DETAILED DESCRIPTION OF INVENTION

FIG. 1 is a schematical illustration of a process, by which solid particles and volatile tar component are removed from the carbon monoxide gas created in a ferroalloy smelting furnace 1. From the metal smelting furnace 1, the carbon monoxide gas is conducted to a gas scrubber 2, which can be a conventional venturi scrubber, where carbon monoxide gas is scrubbed by spraying it with a liquid medium, such as water, so that part of the solid particles is discharged along with the water. Then the carbon monoxide gas is conducted from the gas scrubber 2 to a blower 3, by which the flow rate of the carbon monoxide gas is increased. Thereafter the carbon monoxide gas is conducted to a particle feeder 4, where finely divided adsorbent particles are fed in the carbon monoxide gas in order to make the tar component stick on the surface of the adsorbent particles, and the carbon monoxide gas flow containing adsorbent particles is conducted to a particulate filter 5, in which the tar component adhered on the surface of the adsorbent particles is discharged along with the solid particles in the particulate filter 5.

In FIG. 2, the process is otherwise similar to the one described above in connection with FIG. 1, but the process of FIG. 2 has one difference: the particle feeder 4 is arranged prior to the blower 3 in the gas flowing direction. In this way there is avoided the risk that the tar would sick onto the blades of the blower 3.

The employed adsorbent particles A advantageously consist of finely divided coke dust. Preferably 80-90% of the coke dust has a grain size not larger than 0.075 mm.

FIGS. 3 and 5 illustrate a particle feeder 4, by which adsorbent particles A are mixed evenly in the carbon monoxide gas.

The particle feeder 4 includes a gas-tight tank 8 for storing the adsorbent powder A. Oxygen-free inert gas, such as nitrogen or carbon dioxide, can be fed in the tank via a gas duct 9 in order to create an inert gas atmosphere inside the tank 8. The tank 8 supplies adsorbent powder to an electrically driven, rotary shut-off feeder 10 that distributes the continuous adsorbent flow, for example roughly 5-10 kg/h, from the tank 8 to the feed pipe 7. The shut-off feeder 10 prevents the access of carbon monoxide gas in the tank 8. The flow rate of the carbon monoxide gas in the pipeline is accelerated by means of a venturi pipe 6, into which the feed pipe 7 is opened, for instance from the rate 9-13 m/s to the rate v that is roughly 25-29 m/s, which ensures a uniform mixing of the adsorbent particles A in the carbon monoxide gas.

FIG. 4 illustrates a particulate filter 5, by which the solid particles contained in the carbon monoxide gas, including the adsorbent particles on the surface of which the condensated tar component is adsorbed, can be removed from the carbon monoxide gas. When employing a particulate filter according to the publication WO 2008/074912, the obtained maximum dust content for the carbon monoxide gas is below 5 mg/m$^3$. Thus the obtained carbon monoxide gas is very clean and does not contain tar. Consequently, it is sufficiently clean to be used in a process and/or in the generation of electricity.

The particulate filter 5 illustrated in FIG. 4 includes a filtering chamber 11, inside which there is arranged a filter element 12, for example a ceramic element, through which the carbon monoxide gas can be conducted, and on the surface of which filter element the solid particles remain. Inside the chamber 11 there are provided cleaning nozzles 13, by which a strong, recurrent inert gas blasting (for example with nitrogen) is directed to the filter element 12 in order to remove the accumulated solid matter from the filter surface. Washing liquid, such as water, is fed through washing nozzles 14 to the chamber 11, in which case the solid matter that drops from the filter element 12 is slurried to slurry. The slurry is collected in a discharge chamber 15. The slurry is removed from the discharge chamber by a discharge channel 16. Thus the tar component is discharged along with the slurry.

The invention is not restricted to the above described embodiments only, but many modifications are possible within the scope of the inventive idea defined in the claims.

The invention claimed is:

1. A method for removing solid particles and tar component from carbon monoxide gas which contains solid particles and volatile tar components, in which method
    carbon monoxide gas is conducted from a ferroalloy smelting furnace to a gas scrubber,
    the carbon monoxide gas is scrubbed in the gas scrubber by a liquid medium for removing part of the solid particles,
    the carbon monoxide gas is conducted from the gas scrubber to a blower,
    the flow rate of the carbon monoxide gas is increased by the blower, and
    the carbon monoxide gas is conducted to a particulate filter, by means of the particulate filter, the remaining solid particles are essentially filtered from the carbon monoxide gas, characterized in that prior to conducting the carbon monoxide gas to the particulate filter, said gas is conducted to a particle feeder, where finely divided adsorbent particles comprising coke dust are fed to the carbon monoxide gas for adhering the tar component on the surface of the adsorbent particles, and the carbon monoxide gas flow containing adsorbent particles is conducted to the particulate filter, so that the tar component adhered to the adsorbent particles is discharged in the particulate filter; where the carbon monoxide gas flow rate is accelerated and the adsorbent particles are mixed in the carbon monoxide gas with an accelerated flow rate; characterized in that in the particle feeder, the flow rate of the carbon monoxide gas is accelerated by a venturi pipe, and the adsorbent particles are mixed in the carbon monoxide gas in the venturi pipe by means of a feed pipe opening into the venturi pipe.

2. A method according to claim 1, characterized in that 80-90% of the coke dust has a grain size not larger than 0.075 mm.

3. A method according to claim 1, characterized in that the carbon monoxide gas flow rate is accelerated and the adsorbent particles are mixed in the carbon monoxide gas with an accelerated flow rate.

4. A method according to claim 1, characterized in that for a uniform mixing of the adsorbent particles, the flow rate of the carbon monoxide gas is accelerated to the rate of roughly 25-29 m/s.

5. An arrangement for removing solid particles and tar component from carbon monoxide gas which contains solid particles and a volatile tar component, said arrangement including
    a gas scrubber, which is arranged to receive carbon monoxide gas from a smelting furnace (1) for scrubbing the carbon monoxide gas by a liquid medium in order to remove part of the solid particles,
    a blower, which is arranged to increase the flow rate of the carbon monoxide gas, and
    a particulate filter, which is arranged to remove solid particles from carbon monoxide gas, characterized in that the arrangement includes a particle feeder, which is arranged in the flowing direction prior to the particulate filter for feeding in the carbon monoxide gas finely divided adsorbent particles comprising coke dust adsorbing the tar component; characterized in that the particle feeder includes a venturi pipe for accelerating the carbon monoxide gas flow rate, and a feed pipe, which opens into the venturi pipe for feeding adsorbent particles to the carbon monoxide gas flow with an accelerated flow rate.

6. A method according to claim 5, characterized in that 80-90% of the coke dust has a grain size not larger than 0.075 mm.

7. An arrangement according to claim 5, characterized in that the flow rate of the carbon monoxide gas in the venturi pipe is roughly 25-29 m/s.

8. An arrangement according to claim 5, characterized in that the particle feeder includes a gas-tight tank for storing adsorbent particles; a gas duct, through which oxygen-free inert gas, such as nitrogen or carbon dioxide, can be fed to the tank in order to create an inert gas atmosphere inside the tank; and a shut-off feeder for feeding a continuous adsorbent flow from the tank to the feed pipe.

9. An arrangement according to claim 5, characterized in that the particulate filter includes:
    a filtering chamber, inside which there is provided a filter element, through which the carbon monoxide gas can be conducted, and on the surface of which filter element the solid particles remain;
    cleaning nozzles provided inside the chamber for directing the inert gas blasting to the filter element for removing solid matter from the filter surface;
    washing nozzles for feeding washing liquid to the chamber in order to slurry the solid matter removed from the filter to slurry; and
    a discharge chamber for collecting the slurry; and—a discharge channel for removing the slurry from the discharge chamber.

10. A method of cleaning carbon monoxide gas created by smelting ferrochromium in the presence of incompletely coked coke as a reductant, the method comprising:
    scrubbing carbon monoxide gas employing a liquid medium for removing solid particles from the carbon monoxide gas, adding finely divided adsorbent particles comprising coke dust to the carbon monoxide gas for adhering tar present in the carbon monoxide gas to the surface of the adsorbent particles, and subsequently removing adsorbent particles from the carbon monoxide gas, whereby tar adhering to the adsorbent particles is removed from the carbon monoxide gas, and wherein the method comprises, after the scrubbing step and before the step of removing adsorbent particles from the carbon monoxide gas, increasing the flow rate of the carbon monoxide gas.

11. A ferrochromium smelting process comprising:

supplying incompletely coked coke as a reductant to a ferrochromium smelting furnace, removing carbon monoxide gas from the furnace, and cleaning the carbon monoxide gas by a method according to claim 10, wherein the step of supplying incompletely coked coke as a reductant to the ferrochromium smelting process comprises receiving a supply of incompletely coked coke, separating particles of coke dust from the received supply of incompletely coked coke, and supplying coke that remains after separation of the particles of coke dust to the ferrochromium smelting furnace, and the step of adding particles comprising coke dust to the carbon monoxide gas comprises adding the particles of coke dust separated from the received supply of incompletely coked coke to the carbon monoxide gas.

\* \* \* \* \*